Sept. 28, 1965   G. E. SUNDBLAD   3,209,129
DATA HANDLING SYSTEM

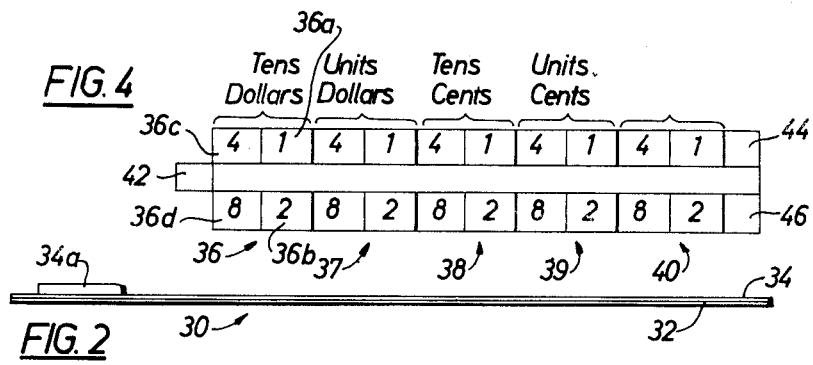
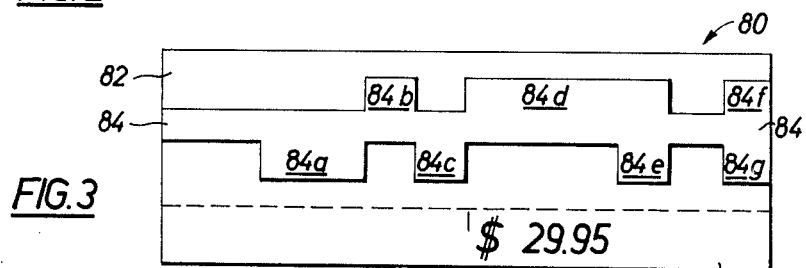
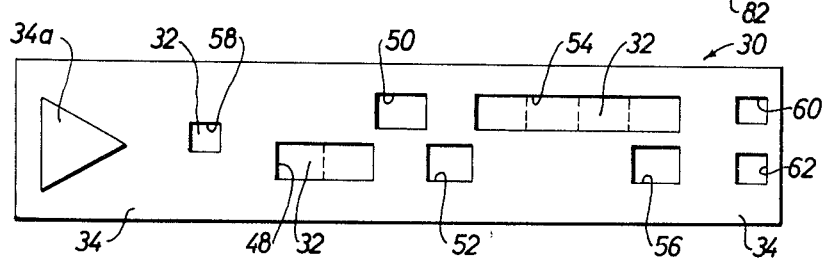
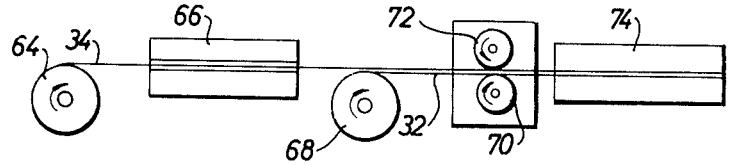

Filed Aug. 24, 1960   7 Sheets-Sheet 3

INVENTOR
GUNNAR E. SUNDBLAD
BY Mason, Kolehmainen
Rathburn & Wyss
HIS ATTORNEYS

Sept. 28, 1965 G. E. SUNDBLAD 3,209,129
DATA HANDLING SYSTEM
Filed Aug. 24, 1960 7 Sheets-Sheet 4

INVENTOR
GUNNAR E. SUNDBLAD
BY
HIS ATTORNEYS

Sept. 28, 1965    G. E. SUNDBLAD    3,209,129
DATA HANDLING SYSTEM
Filed Aug. 24, 1960    7 Sheets-Sheet 5
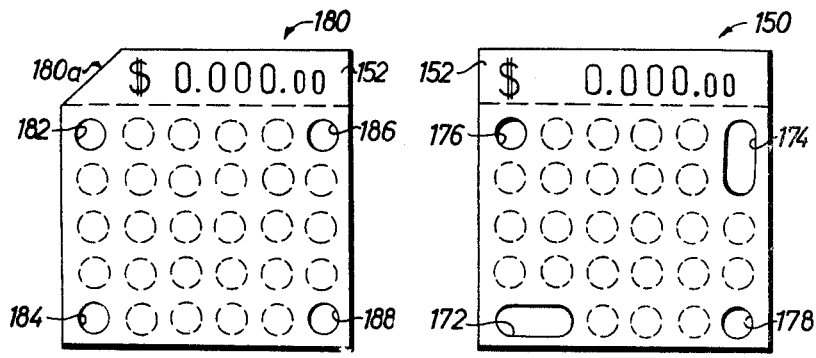
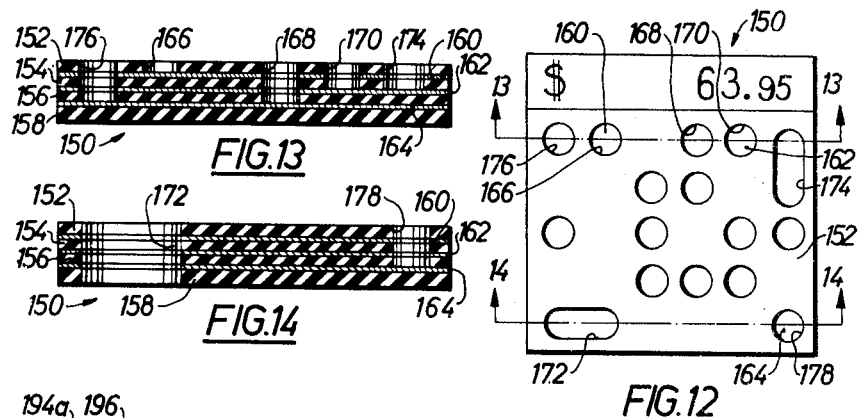
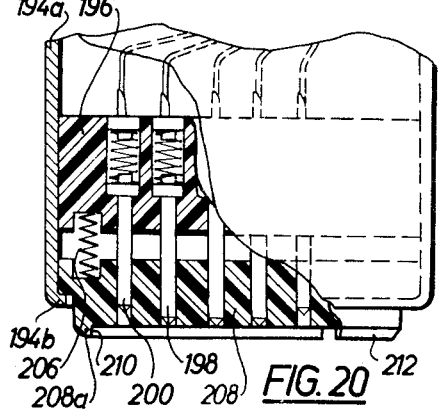
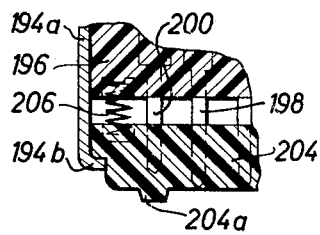
INVENTOR
GUNNAR E. SUNDBLAD
BY Mason, Kolehmainen
Rathburn & Wyss
HIS ATTORNEYS Sept. 28, 1965  G. E. SUNDBLAD  3,209,129
DATA HANDLING SYSTEM
Filed Aug. 24, 1960  7 Sheets-Sheet 6
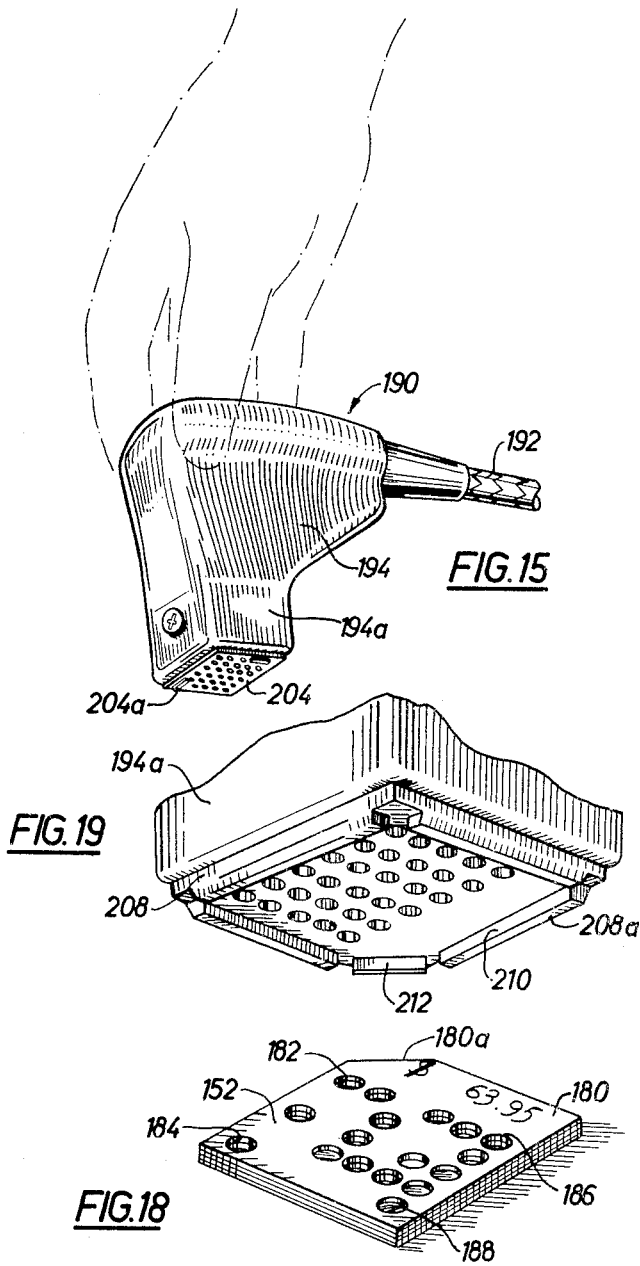
INVENTOR
GUNNAR E. SUNDBLAD
BY
HIS ATTORNEYS

INVENTOR
GUNNAR E. SUNDBLAD
BY
HIS ATTORNEYS

United States Patent Office 3,209,129
Patented Sept. 28, 1965

3,209,129
DATA HANDLING SYSTEM
Gunnar E. Sundblad, Bromma, Sweden, assignor to Svenska Dataregister AB, Stockholm, Sweden, a corporation of Sweden
Filed Aug. 24, 1960, Ser. No. 51,735
Claims priority, application Sweden, Aug. 26, 1959, 7,883/59
11 Claims. (Cl. 235—61.11)

This invention relates to a data handling system and, more particularly, to a new and improved data record and means for reproducing and storing data from the record.

In an attempt to provide reliable business information relating to items of merchandise, such as price and item identification data, some business establishments have adopted the practice of applying tags or labels to the items that carry the desired data not only in printed form, but also in a coded form suitable for machine reproduction. These tags or labels are generally formed of two separable parts, one of which remains affixed to the goods and the other of which can be removed and inserted into the reading or reproducing portion of a stationary business machine. However, removable tags are not practical in certain establishments, such as supermarkets, and the requirement that the tag or a portion thereof be removed to permit its insertion into a stationary reading device often obviates some of the advantages of automatically deriving data from colded primary records.

Accordingly, one object of the present invention is to provide a new and improved data handling system.

Another object is to provide a new and improved record element, such as a tag or label.

A further object is to provide a record element that can be reproduced without removing the label from the item to which it is affixed.

Another object is to provide a record element in which data is stored in the form of a coded continuous pattern of conductive material.

Another object is to provide a record element in which data is stored in the form of a three dimensional pattern of conductive and nonconductive areas.

Another object is to provide a method of forming record elements in which data is stored in the form of a pattern of electrically conductive areas.

A further object is to provide a new and improved device for reproducing data from a record element affixed to the surface of an article.

Another object is to provide a record reading apparatus including new and improved means for insuring accurate positioning of the reading apparatus on the record.

A further object is to provide a data handling system including new and improved means for reproducing data from a record element and for storing the reproduced data in a register means.

Another object is to provide new and improved means for reproducing data stored on a multilayer record element.

In accordance with these and many other objects, an embodiment of the invention includes a tag or label of a laminated construction including a continuous layer of electrically conductive material and a layer of dielectric material. The tag or label is divided into a plurality of separate digit or data fields, and the electrically conductive and dielectric layers are cut out to provide spaced areas or segments of conductivity and nonconductivity in each of the data fields corresponding to a coded representation of the data to be stored on the record element. Since the record element is formed with the pattern of conductive and nonconductive areas on one surface thereof, the data stored on the record element can be reproduced while the record element is permanently affixed to an item of merchandise and without requiring the removal of the record and its insertion into a stationary reading apparatus. The record element also includes a plurality of spaced check areas used to control the positioning of a portable reading element relative to the record.

To provide a means for reproducing the data stored on the record element while this element is affixed to an item of merchandise, a portable and manually supported reading assembly is provided. This assembly includes a plurality of sensing pins carried on the housing of the reading assembly and spaced from each other so as to be adapted to engage each of the discrete areas in each of the data fields. When the reading assembly is placed above and moved toward the record element, the data sensing pins move into engagement with the conductive and nonconductive areas thereon. A continuing movement of the reading assembly toward the record element moves a plurality of pins adapted to engage the check areas into engagement with these areas. If the reading assembly is properly aligned relative to the record element, the sensing pins for engaging the check areas apply a voltage to the conductive layer so that the sensing pins engaging the electrically conductive areas are energized to transfer the stored data to a register unit. In addition, the selective engagement of the check areas by the sensing pins therefor operates a control circuit that insures that data cannot be transmitted to the register unless all of the check areas are contacted, thereby to avoid the transmission of incorrect information to the register. The reading assembly also includes visible or audible indicating means controlled by the check area sensing pins for providing an indication that the reading assembly is correctly positioned on the record element.

In another embodiment of the invention in which the density of data storage that can be obtained with a record element of given size is considerably increased, the record element consists of a laminated structure having a plurality of electrically conductive or metal layers separated by intervening dielectric layers. Data is stored on this record element in three dimensional form by the selective positioning of apertures in different index areas or data fields in the record and by the formation of openings of different depths which expose different ones of the superimposed metal layers for engagement by the sensing elements. These records can be provided with aligning means for insuring the proper positioning of the record element relative to a reading assembly either by providing the record element with an irregular outline or by providing a particular configuration of apertures in the record element which cooperate with like positioned aligning means on the reading assembly.

To provide a mean for reproducing information stored on the three dimensional record elements, a portable reading assembly is provided including a housing carrying a plurality of spring pressed sensing elements disposed for engagement with the exposed surface of a record element secured to an item of merchandise. When the reading assembly is correctly positioned on the record element, as determined by the cooperation of a group of aligning elements on this assembly with the apertures or irregular outline of the record element, and the reading assembly is moved toward the record element, the sensing elements are pressed into engagement with the outer surface of the record element. Certain of the sensing pins engage the upper dielectric surface, while others of the sensing pins engage different ones of the vertically spaced metal layers in accordance with the depths of the apertures or openings formed in the different index areas or positions on the record element. This reading assembly also includes a group of sensing pins equal in number to the number of conductive layers in the record element for connecting each of these layers to a plurality of gating means.

When the data stored on the record element is to be reproduced, a pulse distributor or counting chain is placed in operation under the control of means responsive to the correct positioning of the reading assembly on the tag so that a signal is applied to each of the sensing pins in sequence. The pulse distributor also enables the gating means in synchronism with the application of the pulses to the sensing pins. Thus, the pulses supplied to the sensing pins are selectively transmitted through the different metal layers of the record element to the gating means and then through the enabled ones of the gating means and a translating matrix to a storage register. At the completion of a single cycle of operation, the pulse distributor is disabled with the data recorded on the record element stored in the register means.

Many other objects and advantages of the present invention will become apparent from considering the following detailed description in conjunction with the drawings in which:

FIG. 1 is a plan view of a record element embodying the present invention;

FIG. 2 is a front elevational view of the record element shown in FIG. 1;

FIG. 3 is a plan view of another record element embodying the present invention;

FIG. 4 is a diagram illustrating the code used with the record elements shown in FIGS. 1–3;

FIG. 5 is a schematic diagram of an apparatus for making the record element shown in FIGS. 1–3;

FIG. 11 is a plan view of a record element or label forming a second embodiment of the invention;

FIG. 12 is a plan view of the record element shown in FIG. 11 with a data entry stored thereon;

FIG. 13 is a sectional view taken along line 13—13 in FIG. 12;

FIG. 14 is a sectional view taken along line 14—14 in FIG. 12;

FIG. 15 is a perspective view of a reading assembly for sensing information stored on the record illustrated in FIGS. 11–14;

FIG. 16 is a fragmentary sectional view of a portion of the reading assembly shown in FIG. 15;

FIG. 17 is a plan view of a modification of the record element shown in FIG. 11;

FIG. 18 is a perspective view of the record element shown in FIG. 17 on which a data entry has been recorded;

FIG. 19 is a fragmentary perspective view of a modification of the reading assembly shown in FIG. 15 that is used to derive information from the record element shown in FIGS. 17 and 18;

FIG. 20 is a fragmentary sectional view of the modified reading assembly shown in FIG. 19.

Figure 6:
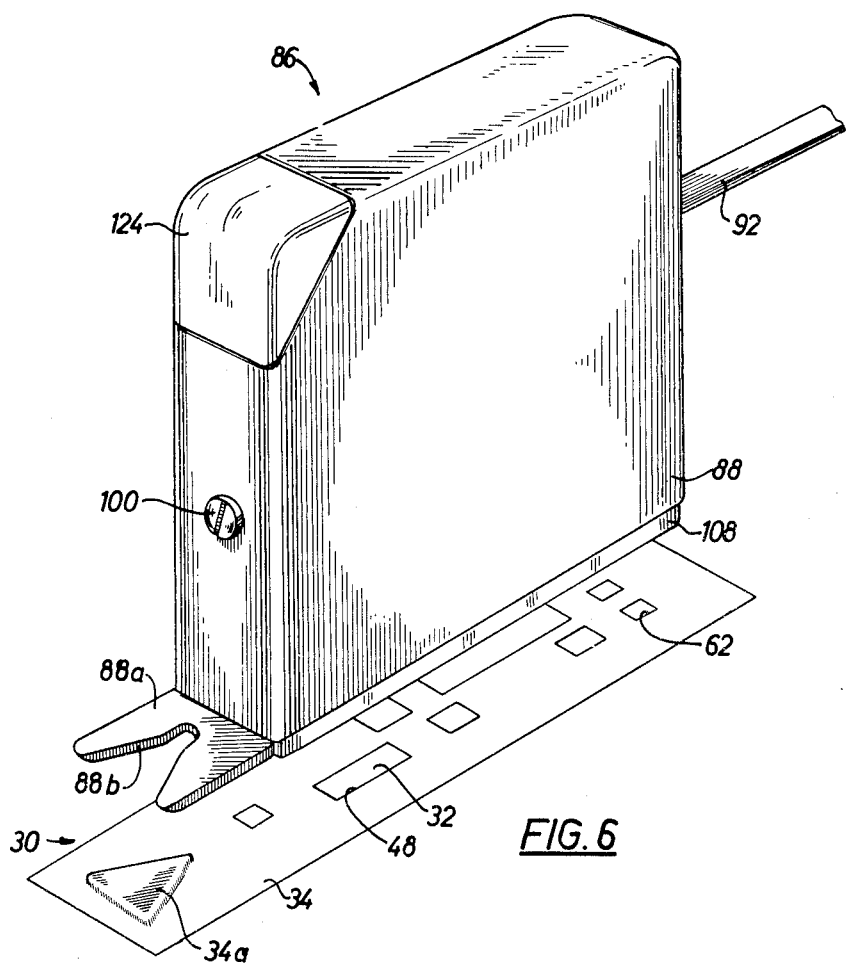
FIG. 6 is a perspective view illustrating a reading assembly disposed adjacent the record element shown in FIG. 1.

Referring now more specifically to FIGS. 1 and 2 of the drawings, therein is disclosed a laminated record element, indicated generally as 30, which can comprise a label or tag adapted to be permanently secured to an item of merchandise. The record element 30 includes a lower layer or lamina 32 of an electrically conductive material, such as metal or metal foil, and an upper layer or lamina 34 of a dielectric material, such as paper. The lower layer 32 comprises a continuous length or width of the metal foil, and the dielectric layer 34 is punched or cut away to expose selected areas of the metal foil 32 in accordance with the coded data entry stored on the record element 30. The upper surface of the dielectric layer 34 is formed with an embossed portion 34a to provide a means for generally determining the correct position of a reading assembly on the record element 30.

Although data entries can be stored on the record element 30 by a number of codes well known in the art, FIG. 4 of the drawings illustrates an arrangement in which a plural digit data entry is stored on the record element 30 by the use of a binary code in which the exposure of an incremental area of the metal layer 32 represents a binary "1." As illustrated in FIG. 4, the upper surface of the record element 30 is divided into five data fields 36–40 representing, for instance, a tens dollar digit, a units dollar digit, a ten cents digit, a units cents digit, and a numerical notation representing an additional item of information, such as a department of a business establishment. Each of the data fields, such as the data field 36, is divided into four index points or areas, such as four areas 36a, 36b, 36c and 36d, representing the binary bits "1," "2," "4" and "8," respectively. The coded pattern provided on the record element 30 also includes three incremental areas 42, 44 and 46 used to control the alignment of the reading assembly with the record element 30.

As indicated above, the upper layer 34 of dielectric material is selectively cut away to expose portions of the conductive layer 32 in accordance with the data entry to be stored on the record element 30. In the example illustrated in FIG. 1, the record element 30 stores a price of $29.95 and provides an indication that the merchandise to which the record element 30 is affixed was sold in department "12." More specifically, the tens dollar digit "2" is represented by the left hand portion of an opening 48 in the layer 34, and the units dollar digit "9" is represented by the right hand portion of the opening 48 and an opening 50 in the dielectric layer 34. The ten cents digit "9" is represented by an opening 52 in the layer 34 and by the extreme left hand portion of an opening 54 which is also formed in the layer 34. The units cents digit "5" is represented by the central two portions of the opening 54, and the department designation "12" is represented by the right hand portion of the opening 54 and an opening 56. Three openings 58, 60 and 62 expose the three incremental areas 42, 44 and 46 on the conductive layer 32 to provide the check points for establishing alignment between the record 30 and the reading assembly.

FIG. 5 of the drawings schematically illustrates an apparatus by which a method of forming the record element 30 can be carried out. The dielectric layer 34 can be provided by a roll of paper tape carried on a supply spool 64. The paper tape or layer 34 is forwarded from the supply spool 64 through a punching assembly 66 in which the embossed portion 34a and the openings 48, 50, 52, 54, 56, 58, 60 and 62 are formed. The assembly 66 can also include a printing means for printing the coded information, such as the price "$29.95," on the record element 30. A continuous web of metal foil which can comprise the layer 32 is provided on a supply spool 68 and is forwarded between a pair of pressure rollers 70 and 72 to which the dielectric layer 34 is also supplied. One of the layers 32 and 34 is supplied with an adhesive so that the pressure roller 70 and 72 bond the layers 32 and 34 together. If desired, the adhesive can be applied separately, and the rollers 70 and 72 can be heated if a thermosetting adhesive is to be used. A cutting assembly 74 positioned at the outlet from the rollers 70 and 72 severs the continuous lengths of the electrically conductive layer 32 and the dielectric layer 34 into discrete record elements 30 which can comprise tags or labels. Obviously, the lower surface of the metal foil or electrically conductive layer 32 can be provided with an adhesive which permits the record element 30 to be affixed to an article. It is possible to secure the record element 30 flush against the surface of an article inasmuch as the information stored thereon can be reproduced by contacting only one surface of this record element.

FIG. 3 of the drawings illustrates a record element, indicated generally as 80, which provides a modification of the record element 30. The record element 80 comprises a lower dielectric layer 82 and an upper electrically conductive layer 84 that is provided with an irregular outline in accordance with the data to be stored on the record element 80. The code used in storing data on the element 80 is illustrated in FIG. 4 and, in the illustrative example shown in FIG. 3, the record element 80 stores an item cost of $29.95 and an indication that the article is in department "12." This information is provided by forming the metal layer 84 with the projecting electrically conductive areas 84a, 84b, 84c, 84d and 84e which correspond to the conductive areas exposed by the openings 48, 50, 52, 54 and 56, respectively. To provide the incremental check areas for insuring the alignment of the record element 80 with a reading assembly therefor, the left hand portion of the layer 84 provides an exposed metal area corresponding to that exposed by the opening 58, and the layer 84 is provided with two projecting portions 84f and 84g corresponding to the metal exposed by the openings 60 and 62.

The apparatus shown in FIG. 5 can be used to form the record element 80 by supplying the metal foil forming the layer 84 on the supply reel 64. The punching means 66 punches or removes the metal layer 84 to provide a pattern, such as that shown in FIG. 3, representing the desired data entry. The continuous web of paper tape forming the dielectric layer 82 is mounted on the supply reel 68 and is secured to the conductive metal pattern provided by the layer 84 by the pressure rollers 70 and 72 in the manner described above. The cutting means 74 then severs discrete lengths of the joined layers 82 and 84 to provide the record elements 80.

Figure 7:
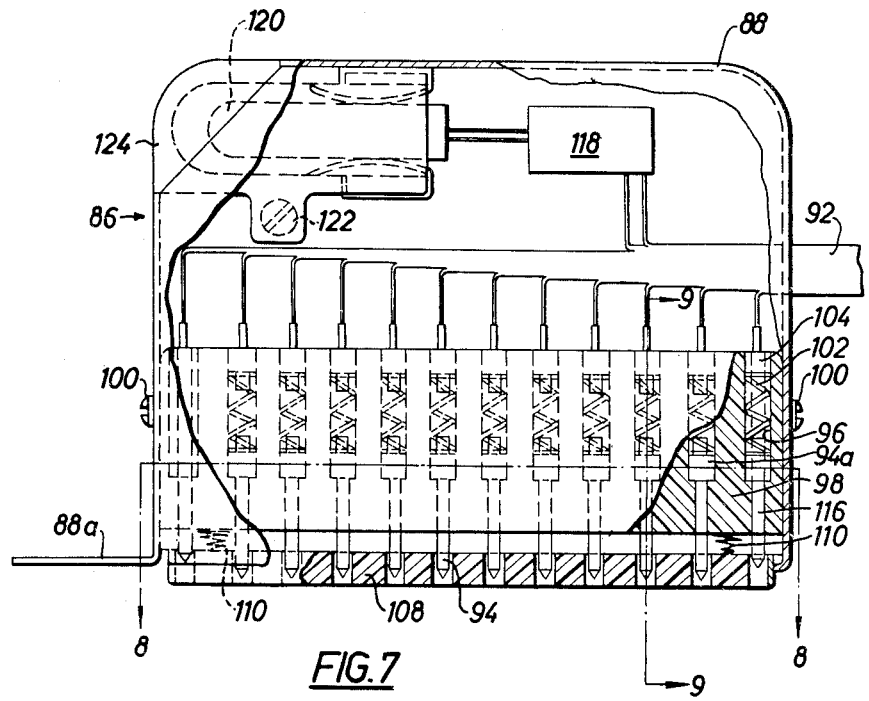
FIG. 7 is a fragmentary elevational view in partial section of the reading assembly shown in FIG. 6.
Figure 8:
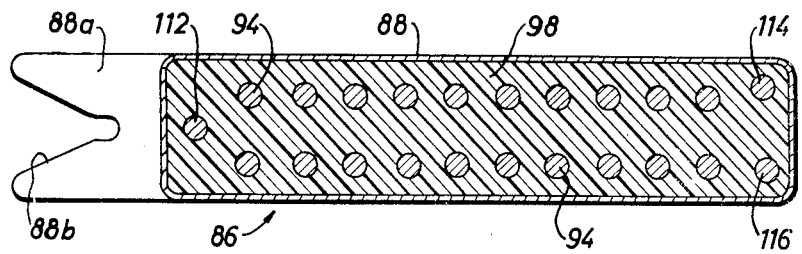
FIG. 8 is a sectional view taken along line 8—8 in FIG. 7.
Figure 9:
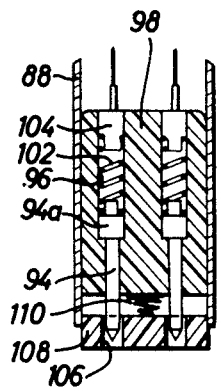
FIG. 9 is a fragmentary sectional view taken along line 9—9 in FIG. 7, assuming that the complete assembly is shown therein.
Figure 10:
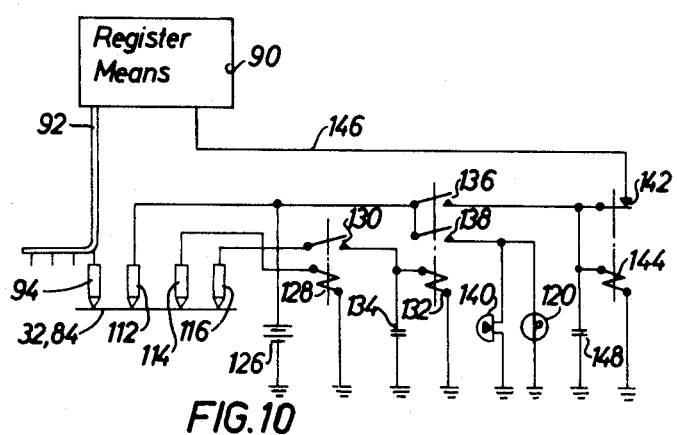
FIG. 10 is a schematic circuit diagram of a circuit for controlling the reproduction of information by the reading assembly shown in FIGS. 6–9.

A reading assembly, indicated generally as 86 (FIGS. 6–9), is provided for reproducing the data entry stored on the record elements 30 and 80 and for transferring this information to suitable register means. The reading assembly 86, which is portable and capable of manual manipulation, comprises a housing 88 containing sensing and control elements which are connected to suitable register means 90 (FIG. 10) by a length of flexible cable 92. To provide means for selectively establishing contact with the metal or electrically conductive layers 32 and 84 in the records 30 and 80, the assembly 86 includes a plurality of sensing pins 94 having a pointed lower end adapted to engage the metal layers 32, 84 and an upper shouldered portion 94a that is slidably mounted in a cylindrical recess 96 formed in a dielectric supporting member 98. The member 98 is secured with in the housing 88 adjacent the lower end thereof by a plurality of fasteners 100. The sensing pins 94, which are slidably mounted in the openings 96, are normally biased to the positions illustrated in FIGS. 7 and 9 by a plurality of compression springs 102 interposed between the shouldered portions 94a of the sensing pins 94 and a plurality of terminal elements 104 that are secured within the upper ends of the openings 96. The terminal elements 104 are connected to the register means 90 over the cable 92 and to the sensing pins 94 through the electrically conductive springs 102. The pointed lower ends of the sensing pins 94 are normally disposed within a plurality of openings 106 formed in a dielectric plate 108 that is slidably mounted within the housing 88 immediately below and spaced from the lower surface of the dielectric member 98. A pair of compression springs 110 disposed between the member 98 and the upper surface of the plate 108 normally biases this plate to the position shown in FIGS. 7 and 9. The reading assembly 86 also includes three additional sensing pins 112, 114 and 116 (FIG. 8) which are of a slightly shorter length than the sensing pins 94 and which are adapted to engage the metal layer 32, 84 in the areas 42, 44 and 46, respectively.

The reading assembly 86 also carries a control circuit 118 in the upper portion of the housing 88 which is controlled by the sensing pins 112, 114 and 116 to insure that data is not reproduced from one of the record elements 30 or 80 until the reading assembly 86 is correctly positioned on the record element. The control circuit 118 controls the selective illumination of a lamp 120 that is mounted in the upper forward corner of the interior of the housing 88 to provide a visible indication when the reading assembly 86 is correctly positioned on the record element 30, 80. The lamp 120 is supported by a bracket 122 so that a portion thereof is disposed adjacent a transparent window 124 (FIGS. 6 and 7) which permits the visual indication to be observed by the operator.

To provide a means for moving the reading assembly 86 and the record element 30 into generally aligned positions, the forward wall of the housing 88 is provided with an outwardly projecting portion 88a having a generally V-shaped notch 88b formed therein. When the embossed portion 34a is disposed within the notch 88b, the record element 30 is generally aligned with the sensing pins in the reading assembly 86.

As indicated above, the control circuit 118 (FIG. 10) provides means for insuring that the sensing pins 94 are not effective to control the storage of information in the register means 90 until the record element 30, 80 is correctly positioned relative to the reading assembly 86. When data is to be derived from one of the record elements 30, 80, the reading assembly 86 is disposed above the record element, and the lower surface of the plate 108 is placed on the record in a generally aligned position determined either by the insertion of the embossed portion 34a into the V-shaped notch 88b or by the alignment of an edge of the housing 88 with a suitable indicating mark, such as the dashed line shown in FIG. 3 carried on the upper surface of the dielectric layer 82. The housing 88 of the reading assembly 86 is then moved downwardly so that the springs 110 are compressed to cause upwardly directed movement of the plate 108.

The sensing pins 94 then engage all of the index areas in all of the fields 36–40, and the compression springs 102 are slightly compressed by upward movement of the sensing pins 94 so that the pointed ends of these pins are biased into intimate engagement with the upper surface of the record element 30, 80. This pressure, however, is not sufficient for the sensing pins 94 to penetrate the dielectric layer in those index areas or segments of the data fields 36–40 that are covered by the dielectric layer 34. The final downward movement of the housing 88 toward the record element 30, 80 moves the sensing pins 112, 114 and 116 into engagement with the record element 30, 80. If the reading assembly 86 is not correctly aligned with the record element 30, 80, the control circuit 118 prevents the sensing pins 94 from controlling the register means 90. However, when the pins 112, 114 and 116 are moved into engagement with the electrically conductive layer 32, 84 in the areas 42, 44 and 46, respectively, the operation of the control circuit 118 to control the transfer of the data entry from the sensing pins 94 to the register means 90 is initiated.

The control circuit 118 (FIG. 10) includes means for energizing the electrically conductive layer 32, 84 and for preventing the transfer of information from the reading assembly 86 to the register means 90 unless the reading assembly is correctly aligned relative to the record element 30, 80. When the sensing pin 112 is moved into engagement with the conductive layer 32, 84, a battery 126 is connected through the sensing pin 112 to the conductive layer so that a potential is supplied to the remaining pins 94, 114 and 116. The potential applied to the pin 114 is applied to the operating winding of a relay 128 so that this relay operates to close a pair of contacts 130. The closure of the contacts 130 forwards the operating potential from the sensing pin 116 to the operating winding of a relay 132 to operate this relay. The closure of the contacts 130 also charges a capacitor 134 so that the relay 132 is rendered slow-to-release.

The operation of the relay 132 closes a plurality of pairs of contacts 136 and 138. The closure of the contacts 138 illuminates the lamp 120 to provide a visible indication that the reading assembly 86 is correctly aligned with the record element 30, 80. The closure of the contacts 138 also energizes an audible indicator 140, such as a buzzer, to provide an audible indication of the correct alignment.

The closure of the contacts 136 forwards the operating potential through a pair of normally closed contacts 142 on a relay 144 so that a start signal is forwarded over a conductor 146 to the register means 90. The receipt of this start signal at the register means 90 renders the data storing means therein responsive to the potentials selectively applied to the sensing pins 94. Accordingly, the data entry stored on the record element 30, 80 is now transferred to the register means 90.

In order to prevent inadvertent movement of the reading assembly 86 relative to the record element 30, 80 from causing the double entry of a data item or an incorrect entry of a data item into the register means 90, the closure of the contacts 136 completes the energizing circuit for the relay 144 so that this relay operates to open the contacts 142. When the start potential is removed from the conductor 146, the register means 90 is disabled. The closure of the contacts 136 also charges a capacitor 148 to delay the release of the relay 144. Thus, if the reading assembly 86 is inadvertently shifted relative to the record element 30, 80 so that one of the sensing pins 112, 114 or 116 is moved out of engagement with the electrically conductive layer 32, 84, the relay 144 and the relay 132 remain operated to prevent a second entry of the data item into the register means 90 when the reading assembly is moved back to its correct position.

When the data entry has been stored in the register means 90, the housing 88 of the reading assembly 86 is lifted from the record element 30, 80 so that the energizing potential provided by the battery 126 is removed from the pins 94, 114 and 116. This interrupts the operating circuit for the relay 128 so that this relay releases to open the contacts 130. The capacitor 134 discharges through the winding of the relay 132 to delay the release of this relay. At the expiration of its slow-to-release interval, the relay 132 releases to open the contacts 136 and 138. The opening of the contacts 138 terminates the energization of the audible indicator 140 and the lamp 120. The opening of the contacts 136 interrupts the operating circuit for the relay 144. The capacitor 148 now discharges through the winding of the relay 144 so that at the end of its slow-to-release interval, this relay releases to again close the contacts 142. The reading assembly 86 has now been restored to a normal operating condition.

FIGS. 11–14 disclose a second embodiment of the invention which permits a higher density storage of data on a record element indicated generally as 150. The element 150 consists of four dielectric layers 152, 154, 156 and 158 between which are interposed three electrically conductive or metal layers 160, 162 and 164. The multilayer or three dimensional record element 150 increases the density of data storage by storing data not only by index areas or positions, but also by the establishment of an electrical contact with one of the three conductive layers 160, 162 and 164. This is accomplished by providing each of the index areas with an absence of an opening or with an aperture or opening of one of three different depths terminating at three different levels in which an area on one of the conductive layers 160, 162 and 164 is exposed.

A blank record element 150 is illustrated in FIG. 11 and a plurality of different index points or areas on this record element are shown in dashed outline. Although many different coding systems can be used, the present invention is illustrated by the use of a pair of index points or areas to represent values from "0" through "15." If two of the index points represented by dashed line are assigned to control functions, eleven notations having values varying between "0" and "15" can be stored on the record element 150 shown in FIG. 11. In a first one of each pair of index areas or points on the record element 150, the establishment of a contact with the upper layer 160 represents "1," while the establishment of a contact with this layer in the second index area represents "4." In the second layer 162, the establishment of a contact in the first index point represents "2," and the establishment of a contact in the second index point on the layer 162 represents "8." In the third layer 164, the establishment of a contact in the first index point represents "3" and, in the second index point the value "12." Thus, the establishment of an electrical contact with one of the three layers 160, 162 and 164 in one of each pair of index areas or of one electrical contact in both of the two index points permits the storage of a notation having a value between "0" and "15." This coding arrangement is indicated schematically in FIG. 21 of the drawings.

As a further illustration, the layer 152 in FIG. 13 includes an opening 166 so that an index area of the conductive layer 160 is exposed. If the opening 166 is formed in one index position, the exposed portion of the layer 160 represents "1" whereas the same exposed area represents "4" if the opening 166 is located in the second of the pair of index points. Similarly, an opening 168 extending through the layers 152, 160, 154, 162 and 156 exposes a portion of the layer 164. In one index point, the exposed portion of the layer 164 represents "3" and, in the other index point, a value of "12." An opening 170 formed in the layers 152, 160 and 154 exposes a portion of the conductive layer 162. This can represent either "2" or "4" in dependence on the index position in which the opening 170 is provided.

In addition to the index points assigned for data storage, the record element 150 includes a first opening 172 which extends through all of the layers 152, 154, 156, 158, 160, 162 and 164 and a second opening 174 which extends through the layers 152, 160 and 154 that are used for aligning a reading assembly with the record element 150. The record element 150 also includes four index positions that are used for control purposes. FIGS. 11–14 illustrate two openings 176 and 178, which expose the layer 164, that are used in controlling the operation of the reading assembly, and openings (not shown) in two additional ones of the index points are provided exposing a portion of the layer 160 and a portion of the layer 162.

A record element 180 (FIGS. 17 and 18), which comprises a modification of the record element 150, is identical to the record element 150 except that one corner 180a thereof is bevelled or tapered to provide a means for aligning the record element 180 with a reading assembly therefor. Thus, the enlarged openings 172 and 174 provided in the record element 150 are not required. Accordingly, it is possible to position four openings 182, 184, 186 and 188 in the four corners of the punched area of the record element 180 to provide the control functions afforded by the openings 176 and 178 and the other two openings in two other index positions (not shown) in the card 150. One of the openings 182, 184, 186 and 188 exposes the layer 160, another one of these openings exposes the layer 162, and the two remaining ones of these openings expose a portion of the layer 164.

The record elements 150 and 180 can be made by an apparatus of the type shown in FIG. 5 of the drawings. Each of the dielectric layers 152, 154, 156 and 158 is provided by a length of paper tape contained on a supply spool similar to the spool 64, and each of the electrically conductive layers 160, 162 and 164 is also provided in a continuous form, such as a length of metal strip, on a supply reel similar to the supply reel 64. The dielectric and electrically conductive layers from the supply reels each pass through an individual punching assembly similar to the assembly 66 in which apertures are formed in different ones of the index areas in accordance with the data entry to be recorded on the record elements 150, 180. In addition, the punching assemblies can include fixed punching means for supplying the apertures defining the aligning openings 172 and 174 and the control openings 176, 178, 182, 184, 186 and 188. After the individual dielectric and electrically conductive layers have been punched, they are joined together, as by the use of adhesive, by the pressed rollers 70 and 72, and discrete lengths of the laminated strips are severed by the cutting assembly 74 to provide the individual record elements 150 and 180. These records can also be made by a punching apparatus that removes cores of different lengths from a completed, blank record element 150 or 180 (FIGS. 11 and 17) to provide the variable depth openings.

Figure 21:
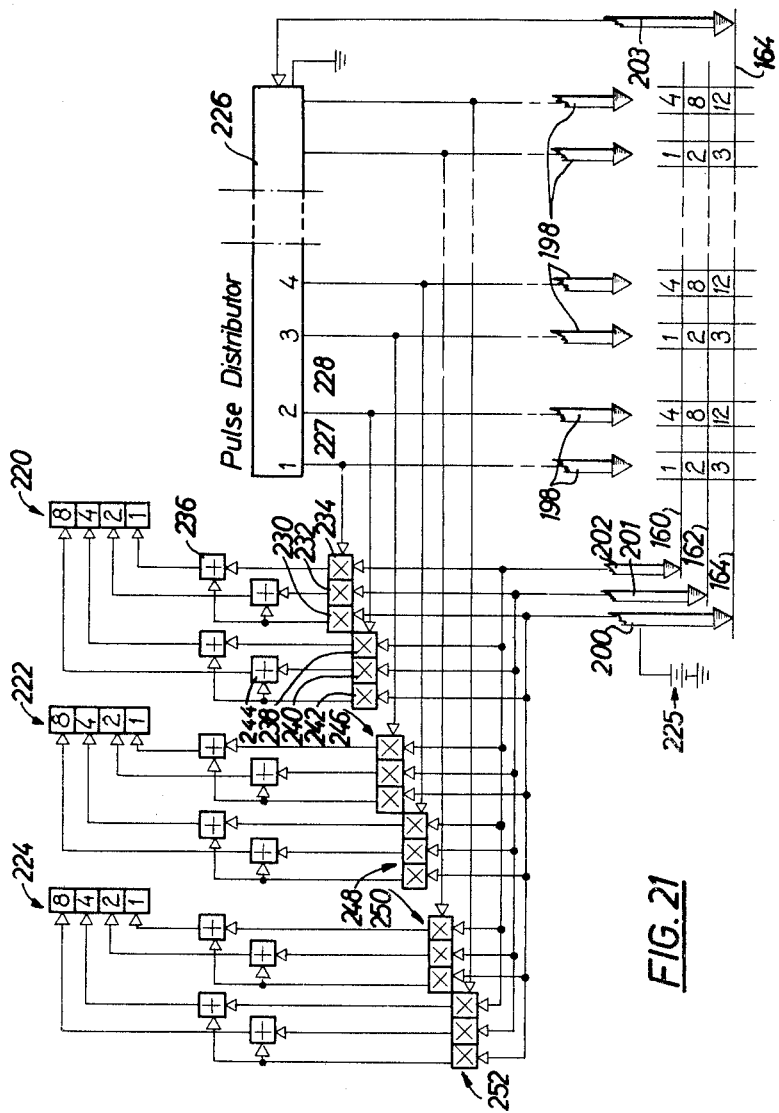
FIG. 21 is a logic diagram of a circuit for controlling the reproduction of information from the records shown in FIGS. 11, 12, 17 and 18 by the reading assembly shown in FIGS. 15, 16, 19 and 20.

To provide means for reproducing the information stored on the record elements 150 and 180, a portable reading head (FIGS. 15, 16, 19 and 20), indicated generally as 190, is provided which is connected by a flexible cable 192 to the control circuit shown in FIG. 21. In general, the reading head 190 is identical in construction to the reading assembly 86 except for the arrangement of the sensing means therein. The reading head 190 includes a housing 194 having a depending portion 194a in which is secured a dielectric supporting member 196 (FIGS. 16 and 20) carrying a plurality of spring biased sensing pins 198, each of which is adapted to engage any one of the electrically conductive layers 160, 162 or 164 in one of the index areas in accordance with the depth of the aperture or opening with which the sensing pin 198 is aligned. In addition to the pins used for sensing the entry recorded on the elements 150 and 180, the sensing head 190 includes four sensing pins 200–203 (FIG. 21) for controlling the operation of the register means. The pins 200 and 203 are adapted to engage the layer 164, the pin 201 is adapted to engage the layer 162, and the pin 202 is adapted to engage the layer 160. The pins 200–203 can be shorter than the sensing pins 198 for the same reason that the pins 112, 114 and 116 are shorter than the sensing pins 94.

In order to adapt the reading head 190 for use with the record element 150, the lower end of the depending portion 194a of the housing 194 movably supports an apertured plate 204 (FIG. 16) in which the ends of the pins 198 and 200–203 are disposed. The plate 204 is normally biased by a plurality of springs 206 to a lower position in which a projecting edge on the plate 204 engages a flange 194b on the housing 194. The lower surface of the plate 204 includes a pair of projecting portions 204a of different depths which are received within the openings 172 and 174 in the record element 150.

To adapt the reading head 190 for use with the record element 180, a plate 208 (FIGS. 19 and 20) is substituted for the plate 204 in the depending portion 194a of the housing 194. The plate 208 includes a peripherally extending rib 208a defining a recess 210 in which the record element 180 is received. One corner of the peripheral rib 208a includes an offset rib 212 which is adapted to engage the tapered portion 180a on the record element 180 to insure that this record element is properly located relative to the portable reading head 190.

A circuit for controlling the transfer of information from the record elements 150 and 180 to a register means is illustrated in logic diagram form in FIG. 21 of the drawings in which the components of the circuit are illustrated by logic symbols. The logic symbols comprise blocks with identifying characters therein designating the function performed by the circuit represented by the block. In FIG. 21, logical "OR" gates are represented by a "+" and logical "AND" gates by an "X." Although the various circuits illustrated by the logic blocks are well known, suitable components of a type that can be used in the circuit shown in FIG. 21 are illustrated and described in detail in two books by R. K. Richards entitled "Arithmetic Operations in Digital Computers" and "Digital Computer Components and Circuits" published by D. Van Nostrand Company, Inc.

When the data reproducing apparatus is placed in operation, the reading head 190 is moved toward one of the record elements 150 or 180 so that the plates 206 or 208 are depressed to permit the sensing pins 198 to enter the plurality of openings, such as the openings 166, 168 and 170, to engage different ones of the conductive layers 160, 162 and 164 in accordance with the information stored on the record element. This movement of the reading head 190 toward the record element 150 or 180 moves the sensing pins 200, 203 into engagement with the conductve layer 164, the sensing pin 202 into engagement with the conductive layer 160, and the sensing pin 201 into engagement with the conductive layer 162. When all of the sensing pins 200–203 engage the proper ones of the conductive layers 160, 162 and 164, an indication is provided that the reading head 120 is properly positioned on the record element 150 or 180, and the control circuit is placed in operation to initiate the transfer of data from the sensed record element to a register means.

In the circuit shown in FIG. 21, three binary registers 220, 222 and 224 for storing three separate digital notations or entries are provided. Each of these data registers can comprise four bistable circuits that are operated to alternate stable conductive states to represent the presence or absence of a bit in the related binary order. As shown in FIG. 21, the lowermost stage of each of the registers 220, 222 and 224 is adapted to store a bit in the lowest binary order represented by "1," and the remaining three stages of each of these registers are adapted to store binary bits in ascending binary orders represented by the digits "2," "4" and "8."

As indicated above, the control circuit is placed in operation when the sensing pins 200–203 are properly located in engagement with the proper ones of the conductive layers 160, 162 and 164. More specifically, a pulse or potential source 225 can be connected to the sensing pin 200 so that a signal is transmitted over the conductive layer 164 to the sensing pin 203 and from the sensing pin 203 to the input of a pulse distributor 226. The completion of the circuit between the pins 200 and 203 provides a start signal to initiate a cycle of operation of the pulse distributor 226. The sequential signals provided by the distributor 226 during its cycle of operation control the enabling of the gates connected to the pins 200, 201, and 202. The pulse distributor delivers pulses in sequence to each of a plurality of output conductors, such as a pair of conductors 227 and 228. When the first pulse generated by the distributor 226 is applied to the conductor 227, this pulse is applied as one enabling potential to three "AND" gates 230, 232 and 234 so as to partially enable these gates. The pulse or signal supplied to the conductor 227 is also forwarded over the first sensing pin 198 in the pair of sensing pins for sensing the two index areas or points in which the first data item is stored. This pulse is selectively applied to one of the three conductive layers 160, 162 or 164 in accordance with the depth of the aperture or opening in the record element 150 or 180 in which this sensing pin 198 is disposed.

Assuming that the first data item or digit to be reproduced from one of the records 150 or 180 is "9," the pin 198 connected to the conductor 227 engages the conductive layer 160 so that the signal from the distributor 226 is transmitted over the layer 160 and the pin 202 to the other input of the "AND" gate 234. Since this gate is now completely enabled, its output transmits a signal through an "OR" gate 236 to the lowest ordered binary stage in the register 220. Signals are not applied through the partially enabled "AND" gates 230 and 232 inasmuch as the sensing pin 198 connected to the conductor 227 does not engage either of the conductive layers 162 or 164.

The pulse distributor 226 then applies a signal to the conductor 228 which is forwarded to three additional "AND" gates 238, 240 and 242 to partially enable these gates. The outputs of the gates 238, 240 and 242 are connected to the input of the register 220 through a translating matrix. The signal applied to the conductor 228 is also transmitted over the sensing pin 198 to one of the layers 160, 162 and 164. Since the value of the first digit is assumed to be "9," the sensing pin 198 connected to the conductor 228 engages the conductive layer 162. Therefore, the signal supplied to the conductor 228 is forwarded over the layer 162 and the sensing pin 201 to the other input of the "AND" gate 240. This enables the "AND" gate 240 so that a signal is transmitted through an "OR" gate 244 to the highest ordered stage in the register 220 representing "8." Since the stages representing "8" and "1" in the register 220 have now been set, this register stores the reproduced digit "9."

The translating matrix, which includes the gates 236 and 244, is connected between the "AND" gates 230, 232, 234, 238, 240 and 242 and the four stages of the register 220 and converts the data item stored on the record element 150, 180 as six bits "1," "2," "3," "4," "8" and "12" into a true binary representation in the register 220 including the bits "1," "2," "4" and "8." A data item is stored on the record element 150, 180 by using a single bit from one or both of the two groups "1," "2," "3" and "4," "8," "12." However, in the register 220, a data item can be stored by operating any number of four stages representing "1," "2," "4" and "8."

In a similar manner, the pulse distributor 226 applies signals to the remaining output conductors in sequence so that a plurality of other groups of "AND" gates 246, 248, 250 and 252 are partially enabled and the remaining sensing pins 198 are supplied with operating signals. The signals from the pins 198 are forwarded over the layers 160, 162 and 164 to complete the enabling of selected ones of the "AND" gates so that signals are forwarded through the translating networks to the inputs of the remaining registers 222 and 224. In this manner, all of the data stored on the record element 150, 180 is transferred to and stored in the registers 220, 222 and 224. When its cycle of operation is completed, the pulse distributor 226 is disabled until a start signal is again provided by completing the circuit between the sensing pins 200 and 203. The control circuit shown in FIG. 21 can include checking circuits associated with the registers 220, 222 and 224 for discarding invalid codes transmitted thereto from a record element.

Although the present invention has been described with reference to a number of embodiments thereof, it should be understood that numerous other modifications and embodiments can be devised by those skilled in the art that will fall within the spirit and scope of the principles of this invention.

What is claimed and desired to be secured by Letters Patent of the United States is:

1. A data handling system for use with a data bearing record including at least one electrically conductive layer, a data storing means, input means connected to said data storing means and adapted to be connected to said layer, sensing means including sensing elements for selectively engaging said layer in accordance with the data stored on said record, and control means for supplying signals to said sensing elements for selective transmission over said layer to said input means to cause the storage of the sensed data in said data storing means.

2. A data handling system for use with a data bearing record including at least one electrically conductive layer comprising a plurality of data registers, input means for each of said registers and each adapted to be connected to said layer, sensing means including a plurality of sensing elements adapted to selectively engage said layer in accordance with the data stored on said record, and control means for enabling said input means in sequence and for supplying signals to said sensing elements for selective transmission over said layer to said input means, thereby to operate said registers to store the data sensed on said record.

3. The data handling system set forth in claim 2 in which said data record includes a plurality of electrically conductive layers and in which each of said input means includes a plurality of signal responsive gate means each adapted to be connected to one of said layers.

4. In a data handling system using a record element having a plurality of separate electrically conductive layers with different areas thereon exposed for electrical contact in accordance with a recorded data entry, a plurality of sensing means for engaging said areas, data receiving means for receiving a data entry reproduced from said record, means for applying signals to said sensing means, and means connected to said layers and controlled by said signals for transferring said data entry from said record element to said data receiving means.

5. In a data handling system using a record element having a plurality of separate electrically conductive layers with different areas thereon exposed for electrical contact in accordance with a recorded data entry, a plurality of sensing means for engaging said areas, data receiving means for receiving a data entry reproduced from said record, gating means connected between said data receiving means and said layers, and a signal source for applying signals to said sensing means for transmission through said layers and said gating means to operate said data receiving means.

6. A data handling system for use with a data bearing record including a plurality of electrically conductive layers comprising a data register, a plurality of input means connected to said data register and each adapted to be connected to one of said layers, sensing means including a plurality of groups of sensing elements, each of said groups of sensing elements being adapted to selectively engage one of said layers in accordance with the data stored on said record, and signaling means connected to said groups of elements for supplying signals over said layers from said elements to said input means for operating said data register in accordance with the data stored on said record.

7. In a data handling system using a record element having a plurality of separate electrically conductive layers with different areas thereon exposed for electrical contact in accordance with a recorded data entry, a plurality of sensing means for engaging said areas, a plurality of registers, gating means connected between each of said registers and said plurality of layers, means for controlling said gating means to render said registers responsive in sequence to signals on said layers, and means including said sensing means for applying signals to said layers in accordance with said recorded data entry.

8. In a data handling system for use with a record element having a plurality of vertically spaced layers of electrically conductive material, said element having a pattern of openings of different depths exposing different areas on different ones of said layers representing a stored data entry, register means for storing a data entry in coded form, a translating matrix responsive to signals received from said layers for supplying operating signals to said register means in said coded form, and means including elements engaging said areas for selectively applying signals to said layers.

9. In a data handling system for use with a record element having a plurality of vertically spaced layers of electrically conductive material, said element having a pattern of openings of different depths exposing different areas on different ones of said layers representing a stored data entry, a plurality of separate sensing means adapted to apply signals to said areas, said sensing means being divided into different groups representing different data items in said data entry, register means for storing said data entry, a signal source, and control means including said sensing means for supplying signals from said source over said layers to said register means in accordance with said data entry.

10. The system set forth in claim 9 in which said control means includes means for applying signals from said source to each of said groups of sensing means in sequence to transfer said data items to said register means in sequence.

11. A data handling system for use with a record formed of a dielectric member and at least one integrally joined electrically conductive layer in which selected first areas of the layer are exposed representing recorded data and second areas of the layer are exposed representing positioning information, which system comprises a plurality of data sensing elements movable into engagement with said record to selectively engage the first areas of the layer, data receiving means for receiving the data reproduced from the record, means including the plurality of data sensing elements for supplying signals representing the data stored on the record to the data receiving means in accordance with the first areas of the layer engaged by the data sensing elements, first and second spaced position sensing elements independent of the data sensing elements and movable into engagement with the second areas of the layer only when the record is disposed in a correct sensing position with the plurality of data sensing elements disposed in proper alignment with the first areas of the layer, a potential source connected to one of said first and second position sensing elements, and means including said potential source and a conductive path through said layer between said first and second position sensing elements for rendering said plurality of data sensing elements effective to control the transfer of data from the record to the data receiving means.

References Cited by the Examiner
UNITED STATES PATENTS

| | | | |
|---|---|---|---|
| 1,149,295 | 8/15 | Schweitzer | 346—1 |
| 1,843,572 | 2/32 | MacGahan | 346—1 |
| 2,254,931 | 9/41 | Bryce | 235—61.12 |
| 2,258,290 | 10/41 | Johnstone et al. | 235—61.111 |
| 2,634,911 | 4/53 | Wolowitz | 235—61.12 |
| 2,706,599 | 4/55 | Smith | 235—61.111 |
| 2,741,430 | 4/56 | Luhn | 235—61.111 |
| 2,750,113 | 6/56 | Coleman | 235—61.11 |
| 2,773,645 | 12/56 | Speh | 235—61.11 |
| 2,830,759 | 4/58 | Hudes et al. | 235—61.111 |

MALCOLM A. MORRISON, *Primary Examiner.*

CORNELIUS D. ANGEL, DARYL W. COOK,
*Examiners.*